United States Patent [19]
Pizzuti

[11] 3,993,348
[45] Nov. 23, 1976

[54] SLIDING ROOF ASSEMBLY

[75] Inventor: William J. Pizzuti, Bloomfield Hills, Mich.

[73] Assignee: Skytrends, Inc., Detroit, Mich.

[22] Filed: Jan. 13, 1975

[21] Appl. No.: 540,727

[52] U.S. Cl. .............................. 296/137 E; 292/57; 296/137 H
[51] Int. Cl.² ........................................... B60J 7/02
[58] Field of Search ........ 296/137 E, 137 G, 137 H, 296/137 B; 49/323, 409, 485; 292/256.5, 58, 57, 62, 241, 67, 66

[56] References Cited
UNITED STATES PATENTS

| | | | |
|---|---|---|---|
| 1,193,148 | 8/1916 | Hornung | 292/57 |
| 1,785,908 | 12/1930 | Malcolm | 296/137 H |
| 2,041,281 | 5/1936 | Bishop | 296/137 H |
| 3,763,595 | 10/1973 | Sudyk | 49/485 |

FOREIGN PATENTS OR APPLICATIONS

| | | | |
|---|---|---|---|
| 858,993 | 12/1970 | Canada | 292/58 |
| 48,154 | 11/1939 | Netherlands | 296/137 B |
| 332,711 | 7/1930 | United Kingdom | 296/137 H |
| 916,589 | 1/1963 | United Kingdom | 296/137 H |
| 465,339 | 4/1937 | United Kingdom | 296/137 H |

Primary Examiner—Robert J. Spar
Assistant Examiner—Donald W. Underwood
Attorney, Agent, or Firm—Hugh L. Fisher

[57] ABSTRACT

A sliding roof assembly for motor vehicles or the like in which the assembly is mounted on the exterior roof portion of a vehicle adjacent an opening in the latter for sliding movement between a forward closed position and the rearwardly open position. The sliding panel member is secured in a latched position in which it is firmly engaged with a resilient seal which prevents the entry of moisture or air through the roof opening. In the unlatched condition of the panel it is supported relative to the seal to minimize friction for facilitating easy sliding movement of the panel.

13 Claims, 11 Drawing Figures

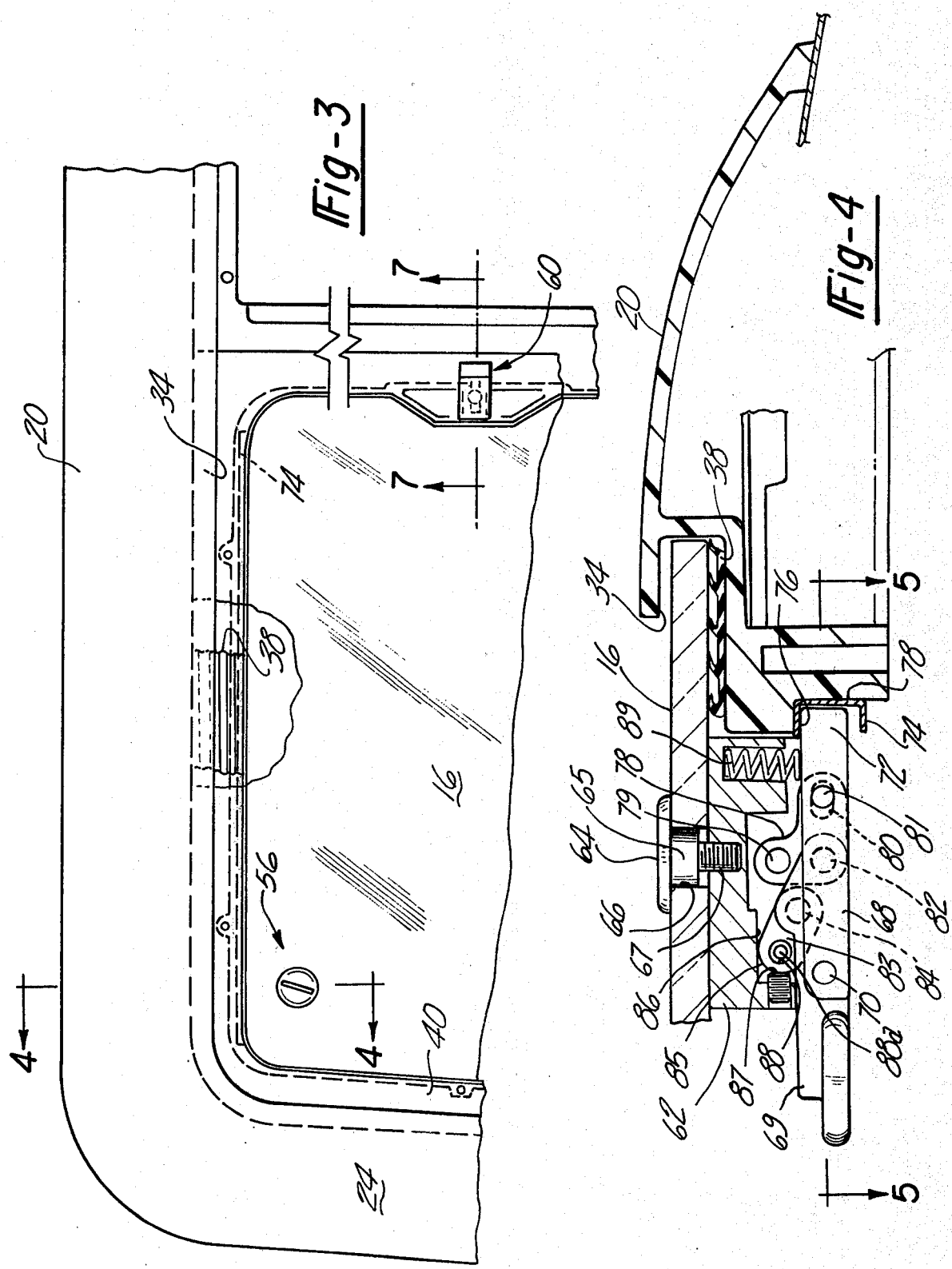

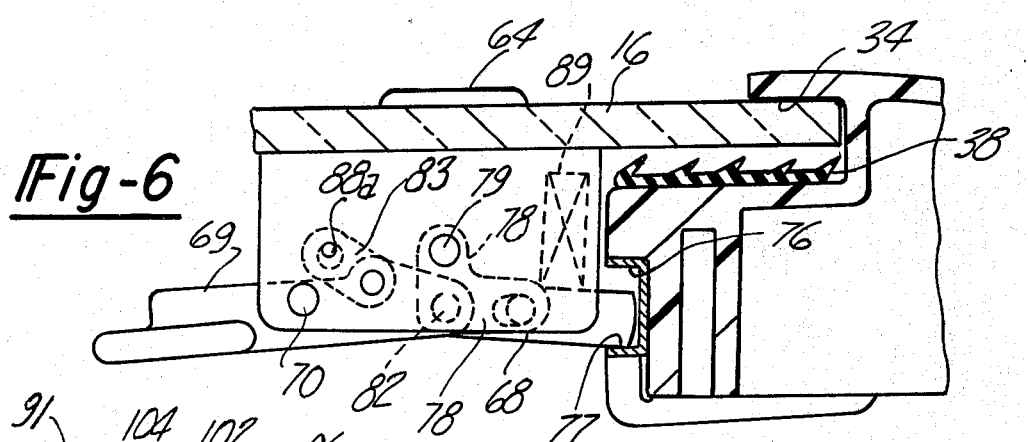
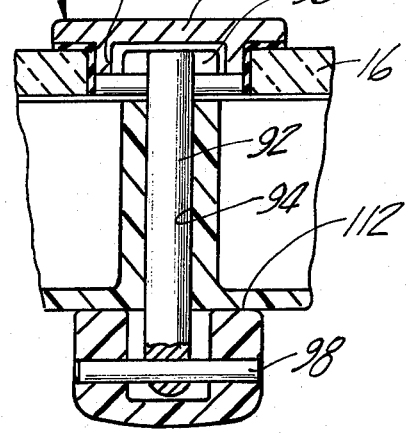
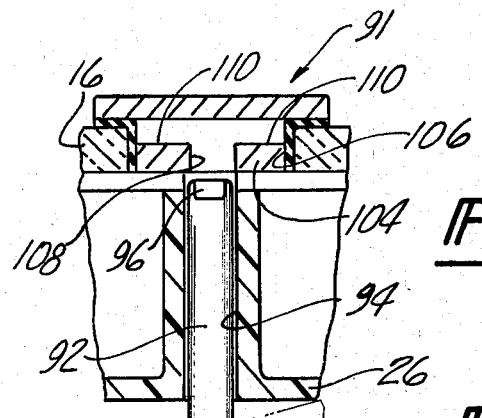
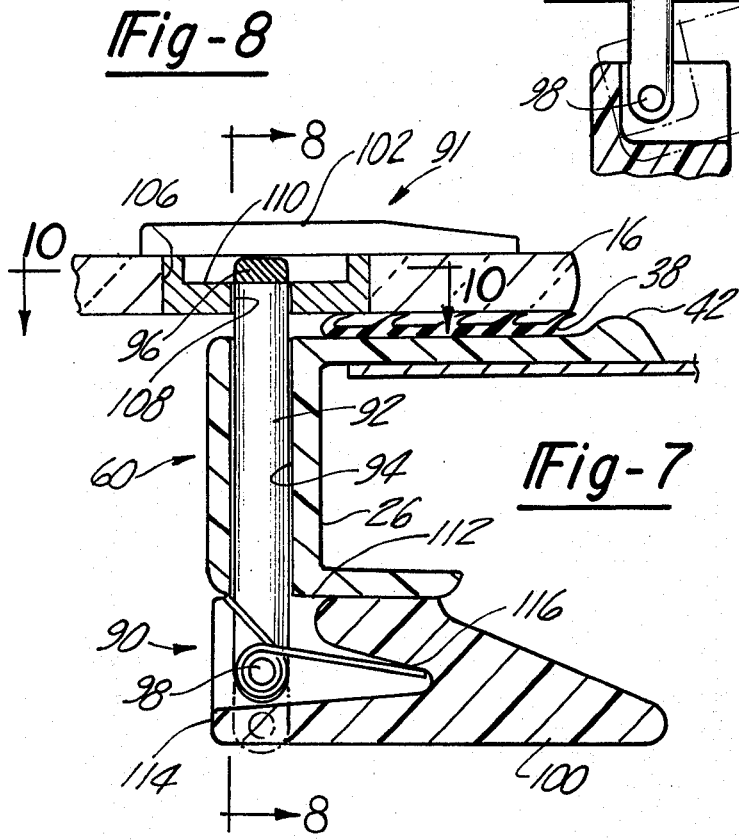
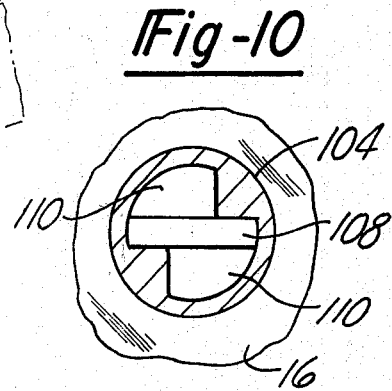
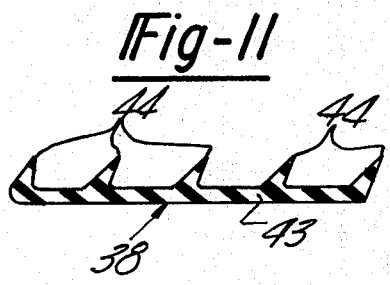

SLIDING ROOF ASSEMBLY

BACKGROUND OF THE INVENTION

This invention relates to sliding roof assemblies for vehicles and more particularly to a sliding roof assembly for attachment on the top of a vehicle roof.

Various forms of sliding roof assemblies have been provided for motor vehicles which fall into two general catagories. In the first type, the sliding roof assembly and the associated mechanism is disposed within the passenger compartment. Such installations are limited to larger vehicles because the mechanism detracts from the head room available to passengers within the vehicle.

In the second type of sliding roof assembly, the mechanism and assembly is mounted at the exterior of the vehicle. Such installations, however, are usually unappealing as they present an obvious, unfamiliar attachment to the vehicle and increase the overall height of the vehicle.

In either form of sliding roof assembly, it is difficult to maintain an adequate seal between the sliding panel and the stationary portion of the assembly to preclude the entry of air and moisture. Moreover, the seals which are used with such arrangements usually retard or restrict the free sliding movement of the panel when it is desired to move the sliding roof panel from a closed to an open position.

SUMMARY OF THE INVENTION

It is an object of the invention to provide a sliding roof assembly which is attached to the exterior of the vehicle and yet provides a relatively low silhouette increasing the vehicle height a minimum amount.

It is another object of the invention to provide a sliding roof assembly for attachment to the exterior of the vehicle in which an efficient sealing arrangement is provided to prevent the entry of moisture or air and in which the effect of the seal is minimized when it is desired to move the sliding roof panel between its open and closed position.

A sliding roof assembly is provided in which a sliding panel, preferably of glass, may be moved between open and closed positions relative to an opening in the roof and in which the assembly is mounted on the exterior of the vehicle. The sliding roof assembly is of simple construction and of a minimum thickness to present a minimum increase in the height of the vehicle. The sliding panel of the sliding roof assembly when disposed in its closed position is tightly sealed to the passage of air and moisture by means of latch assemblies which clamp the sliding panel relative to the seal. In an unlatched position of the panel the front latch assemblies support the forward portion of the panel and the rearward portion of the panel is elevated relative to the seal so that the latter does not interfer with the easy sliding movement of the panel from a closed to an open position. The panel also may be locked against movement in its fully or partially open position.

DESCRIPTION OF THE DRAWINGS

FIG. 3 is a partial plan view of a portion of the sun roof assembly;

FIG. 4 is a sectional view at an enlarged scale taken generally on line 4—4 in FIG. 3;

FIG. 6 is a view of the forward latch assembly seen in an unlatched position;

FIG. 7 is a sectional view of a rearward latch assembly taken on line 7—7 in FIG. 3;

FIG. 8 is a partial sectional view taken generally on line 8—8 in FIG. 7;

FIG. 9 is a view similar to FIG. 8 but showing an unlatched condition of the rear latch assembly;

FIG. 10 is a partial sectional view taken generally 10—10 in FIG. 7 of a portion of the rear latch assembly; and FIG. 11 is an enlarged sectional view of the seal for the sliding glass panel.

DETAILED DESCRIPTION

Figure 1:
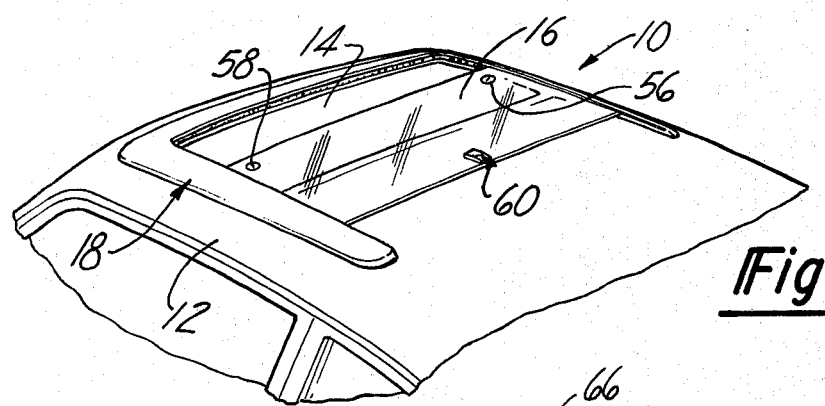
FIG. 1 is a perspective view of a portion of a vehicle roof with the sun roof assembly embodying the present invention disposed in position on the roof.
Figure 2:
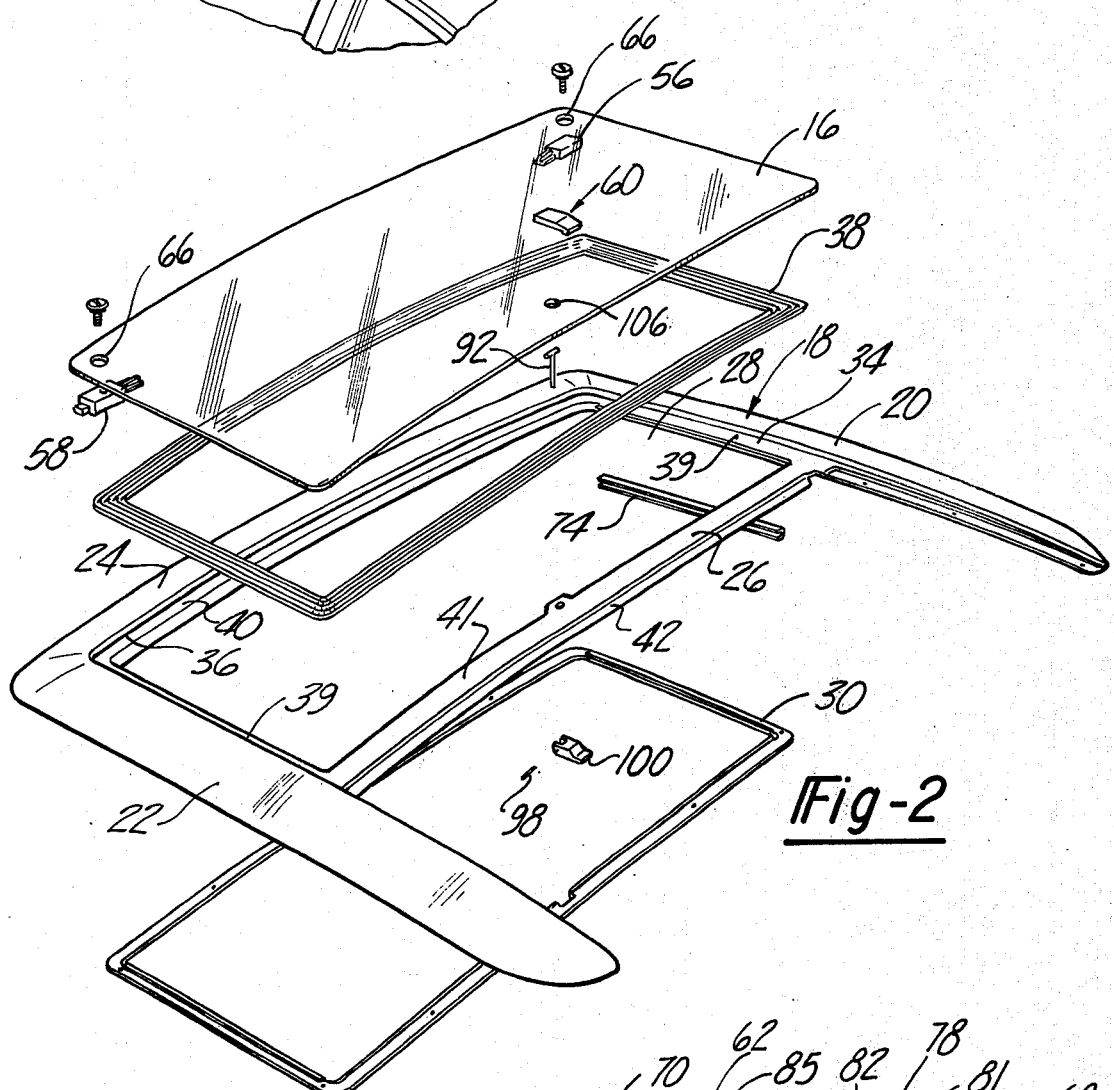
FIG. 2 is an exploded view of the various components of the sun roof assembly shown in FIG. 1.

The sliding roof assembly embodying the invention is designated generally at 10 and is intended for mounting on the roof 12 of a motor vehicle which has an opening 14 therein. The assembly 10 includes a sliding panel or cover 16 which preferably is a sheet of glass to admit light to the passenger compartment. The panel 16 may be moved longitudinally of the vehicle from a closed position in which the glass panel 16 covers the opening 14 to a rearward position in which the opening is uncovered and the glass 16 is stored on the roof of the vehicle rearwardly of the opening.

The sliding roof assembly 10 includes a main frame 18 having a pair of longitudinally extending side members 20 and 22 which are disposed generally parallel to each other and a forward frame member 24 which serves to join the forward ends of the side members 20 and 22 together. The side members 20 and 22 are also joined by an intermediate frame member 26 extending between the side members 20 and 22 transversely to the vehicle and generally parallel to the forward member 24. The forward member 24, the intermediate member 26 and the portions of the side members 20 and 22 therebetween form an opening 28 which conforms to the opening 14 in the roof 12 of a vehicle.

Preferably the frame 18 is molded of a plastic material such as polyurethane or the like into a unitary, single structure which may be fastened on top of the roof 12 of the vehicle in the appropriate position relative to the opening 14 in the vehicle roof by means of fasteners such as screws or the like. Preferably the forward frame member 24 is contoured to slope from the opening forwardly and downwardly relative to the vehicle roof 12 and side members 20 and 22 are similarly contoured to extend laterally outwardly away from the opening and into contact with the vehicle roof 12. The frame 18 may be contoured and colored to match the color and texture of the vehicle roof so that the assembly 10 forms a pleasing and unobtrusive attachment or accessory to the vehicle on which it is mounted.

Disposed within the vehicle at the underside of the roof 12 is a trim ring 30 having an opening conforming to the opening 28 in the frame 18 and which is fastened at the underside of the roof and to the frame 18 by means of screws or the like.

Referring again to the frame 18, the side members 20 and 22 each form facing guide slots or tracks 34 which are adapted to receive the side edges of the glass panel member 16. The tracks 34 extend longitudinally for substantially the full length of the side members 20 and 22. The forward transverse member 24 also forms a similar slot 36 which receives the forward edge of the panel member 16 when the latter is in a closed position over the opening 14.

A continuous generally rectangularly shaped seal member 38 is molded of a resilient, rubber-like material in a continuous uninterrupted form and is disposed to surround the opening 28 in the frame 18. The seal 38 is positioned and mounted by an adhesive or the like on horizontal surfaces 39 forming part of the tracks 34 in side members 20 and 22 and a horizontal surface 40 forming part of the slot 36 of the forward frame member 24. The seal 38 also is fixed in position on an upper horizontal surface 41 of intermediate member 26.

As seen in FIG. 11, the seal 38 has a flat base portion 43 and a plurality of sealing ridge portions 44. The seal 38 is made of a resilient rubber-like material and flocked so that all of the sealing surfaces are covered with polyester fibers. The fibers serve to reduce friction between the glass panel 16 and the rubber-like material of the seal and also tend to absorb some moisture which evaporates at a normal rate without permitting moisture flow past the sealing ridges 44. In addition, the grooves or channels formed between the ridge or sealing portions 44 form troughs which are adapted to trap any moisture which may pass by the outer peripheral ridge portions engaged with the glass panel 16.

The glass panel member 16 is preferably made of a tempered safety glass and is coated to deflect excessive sun rays. The panel member 16 is completely unframed and may be contoured to conform to the curvature of the roof portion 12 of the vehicle.

The glass panel member 16 is held in closed position over the opening 28 in the frame 18 by means of a pair of latches 56 and 58 at the forward and side edges of the cover 16 and a single rear latch member 60 positioned centrally and rearwardly of the panel or cover member 16.

Figure 5:
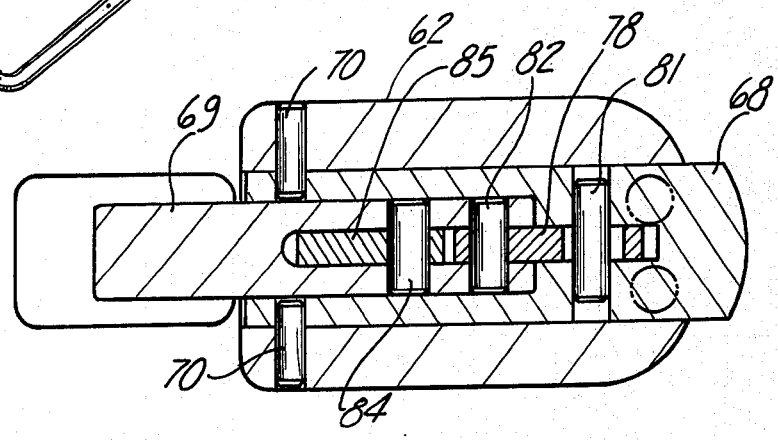
FIG. 5 is a sectional view at an enlarged scale taken on line 5—5 in FIG. 4.

The forward latch assembly 56 and 58 are generally similar except one is used at the left and one at the right side of the cover member 16. Referring to FIGS. 4 and 5, the right forward latch 56 includes a housing member 62 which is generally U-shaped in cross-section and is adapted to be held with its base portion against the underside of the glass panel 16 by means of a threaded fitting having an enlarged cap portion 64 for engaging the top surface of the panel 16 and a smaller circular seat portion 65 which fits within an opening 66 in the panel and a threaded portion 67 which is threadably engaged with a complementary threaded portion in the base of the housing 62.

A clamp bar 68 is generally U-shaped to receive a handle 69 therebetween. The clamp bar 68 is pivoted by a pair of axially aligned pins 70 to the legs of the U-shaped housing 62. The opposite end of the clamp bar 68 is provided with a pawl portion 72 which is received in a metal channel member 74 which is secured to the side member 20 below and in parallel relationship to the groove or track 34. A similar channel member 74 is secured to the side member 22 to co-act with the latch assembly 58.

The clamp bar 68 pivots a limited amount relative to the housing 62 about the pins 70 and in its upper position as shown in FIG. 4, the pawl portion 72 is engaged with a surface 76 of the channel member 74 to pull the panel member 16 into tight sealing position with the seal 38. In a lower or unlatched position of the clamp bar 68 as seen in FIG. 6, the under side of the pawl portion 72 is engaged with a lower surface 77 of the metal channel member 74 and acts to support the panel member 16 in an elevated position relative to the seal 38.

Pivotal movement of the clamp bar 68 is guided by a bellcrank 78 having one of its arms pivoted by a pin 79 to the housing 62. The other arm of the bellcrank 78 fits within the U-shaped clamp bar 68 and has an elongated slot receiving a pin 81 which also passes through and is supported by the clamp bar 68.

An intermediate portion of the bellcrank 78 is received between bifurcations of the handle 69 and is pivoted thereto by means of a pin 82.

The handle 69 also is pivoted to an actuating link 83 by means of a pin 84. The opposite end of the link 83 has a curved cam like surface 85 which is engagable with a wall surface 86 of the housing 62 and with the end of an adjusting screw 87. The link 83 is provided with an enlarged opening 88 to which a pin 88a of relatively small diameter passes and serves to maintain the link 83 in the assembly.

A pair of springs 89 are disposed in openings at one end of the housing 62 and act against the pawl end of the clamp bar 68 to urge the latter downwardly about its pivot pins 70.

In the locked position of the forward latch 56 as seen in FIG. 4, the end of the clamp bar 68 engages the upper surface 76 of the channel member 74 and serves to pull the panel member 16 downwardly into sealing engagement with the seal 38. The clamp bar 68 is held in that condition by means of the slot 80 in the bellcrank 78 which acts on the pin 81 to urge it upwardly. The bellcrank 78 is prevented from rotating in a clockwise direction about the pin 79 by means of the handle 69 which is pivoted to the bellcrank by the pin 82 and by means of the link 83 which also is pivotally connected to the handle 69. In the locked position as seen in FIG. 4 it will be noted that the axis of pin 84 is slightly to one side of an imaginary line passing between the pin 82 and the pin 88a. This is the over-center condition of the link 83 in which clockwise rotation of the bellcrank about the pin 79 is resisted because of engagement of the handle 69 with the wall of the housing. Under this condition the link 83 is urged into firm engagement with the wall surface 86 and the end of the adjusting screw 87.

To unlatch or release the sealing engagement between the panel 16 and the seal 38 the handle 69 is pulled downwardly from the position shown in FIG. 4 to the position shown in FIG. 6. The handle tends to pivot about the pin 82 passing through the bellcrank 78 and to move the pivot pin 84 to the opposite side of the imaginary line passing between the pins 82 and 88a. Thereafter, downward movement of the handle is guided by the bellcrank 78 and the link 83 so that the bellcrank tends to pivot in a clockwise direction about its pivot pin 79 and moves the clamp bar 68 downwardly about its pivot pins 70 so that the free end of the latter engages the surface 77 of the channel member 74. The clamp bar 68 is held in that position by means of the springs 89 so that the glass panel member 16 is elevated relative to the seal 38 to relieve the sealing pressure between the panel and the seal and to support the panel for easy sliding movement relative to the seal.

Referring again to FIG. 4 in which the latch assembly is shown in its lock or latched position, the spacing between the pawl portion 72 and the glass panel 16 can be decreased to increase the sealing force between the panel and the seal 38 through means of the adjusting screw 87. Rotation of the screw 87 to move it to the right as viewed in FIG. 4 serves to move the link 83 to the right and such movement is transmitted to the handle 69 through the pin 84. Movement of the handle to the right causes the bellcrank to pivot in a counter-clockwise direction so that the slot 80 exerts an upward force on the pin 81 tending to pivot the clamp bar 68 in a counter-clockwise direction relative to its pivot pins 70 to increase clamping effort. Rotation of the screw 87 in the opposite direction, that is to the left, as viewed in FIG. 4 serves to lower the position of the pawl 72 relative to the glass panel 16 when the latch assembly is in its locked position shown in FIG. 4 to reduce the clamping force.

The oppositely facing clamp assembly 58 at the left side of the cover member 16 is generally the same as the latch assembly 56 in construction and in operation.

The rear latch assembly 60 for the cover member 16 is best seen in FIGS. 7 through 10 and includes a latch assembly 90 associated with a central portion of the intermediate member 26 and a latch receiving assembly 91 associated with a central rear edge portion of the glass cover member 16.

The latch assembly 90 includes a lock pin 92 slideable in a vertical opening 94 formed centrally and on a forward portion of the internal member 26 as seen in FIG. 4. The upper end of the lock pin 92 has a T-shaped head portion 96 and the lower end of the pin is pivoted by means of a pin 98 to lock handle 100 having a generally U-shaped cross-section at one end.

The T-shaped head portion 96 is adapted to be received in the latch receiving assembly 91 mounted on the sliding glass cover 16. The latch receiving assembly 91 includes a generally rectangular body portion 102 having a depending circular portion 104 which is adapted to be received in an opening 106 formed in the glass cover member 16 with the body member 102 engaging the top surface of the glass panel member 16.

The circular portion 104 forms a housing having an elongated bottom opening 108 which extends longitudinally of the assembly 10 to receive the T-shaped head 96 within the housing. As seen in FIG. 10, provision is made for rotating the T-shaped head 90° in which case the opposite ends of the T-shaped head can rest on lock surfaces 110 at opposite sides of opening 108 and within the housing 104.

Referring again to FIG. 7, the handle 100 is provided with merging cam surfaces 112 and 114. The cam surface 112 is spaced from the pivot pin 98 a distance less than the spacing of the surface 114 from the pin 98.

Referring to FIG. 7 in which the rear latch assembly 60 is shown in its latched position, it will be noted that the glass panel member 16 is in tight engagement with the seal 38, which is deflected slightly. In the latched condition, the T-shaped head 96 is in engagement with the lock surfaces 110 and the cam surface 112 is in engagement with the bottom of the intermediate frame member 26 to pull the lock-pin 92 downwardly to maintain the tight sealing engagement between the panel 16 and seal 38.

To unlock the rear latch 60 so that the latch assembly 90 will separate from the latch receiving assembly 91 associated with the glass panel 16, the handle 100 is pivoted downwardly about the pin 98. Such downward pivotal movement serves to move the cam surface 112 out of engagement with the intermediate member 26 and to bring the cam surface 114 into adjacent facing relationship to the intermediate member 26. Because of the spacing of cam surface 114 is closer to the pivot 98 than the cam surface 112, such downward movement of the handle 100 will relieve the pressure between the panel 16 and the seal 38. Thereafter, the pin 92 may be rotated 90° to dispose the T-shaped pin 96 in a generally fore and aft direction. From the latter position, the T-shaped head portion 96 may be lowered through the slot 108 so that it assumes the position seen in FIG. 9. Under these conditions the latch assemblies 90 and 91 are separated from each other and the handle may be rotated to the position indicated in phantom lines in FIG. 9. In that position the handle 100 will extend transversely to the vehicle and will be maintained in its retracted position by a spring 116 seen in FIG. 7.

The latching procedure is initiated by rotating the handle 100 from its retracted position so that it extends downwardly as shown in full line in FIG. 9. Thereafter, the handle 100 is moved vertically upwardly to bring the cam surface 114 into engagement with the bottom of the intermediate frame member 26. This serves to slide the pin 92 upwardly in the opening 94 so that the T-shaped cross-pin 96 moves upwardly through the slot 108 and within the latch receiving assembly 91. From this position, the pin 92 is rotated 90°, so that the T-shaped head 96 is disposed above the lock surfaces 110. Thereafter, the handle 100 is pivoted from its depending position, to a generally horizontal position as seen in FIG. 7, to bring the cam surface 112 into engagement with the bottom of the intermediate member 26. This serves to pull the lock pin 92 downwardly, so that the T-shaped head 96 pulls the glass panel 16 downwardly into tight sealing engagement with the seal 38.

When the forward latch assemblies 56 and 58 are in their closed position shown in the drawing and the rear lock assembly 60 is also in its latched position the glass cover member 60 is pulled downwardly into firm engagement with the seal 38 so that it tends to distort the sealing portions 44, 46, 48 and 50. Such distortion maintains a tight seal around the entire periphery of the glass cover member 16 to prevent the passage of air or moisture into the vehicle.

When it is desired to open the sliding panel of the sun roof assembly 10 so that the opening 14 is uncovered, it is necessary to move the glass panel member 16 rearwardly. To accomplish this the rear latch 60 is disengaged by separating the assemblies 90 and 91, as previously described. Thereafter downward movement of the handles 69 associated with the forward latches 56 and 58 from the position shown in FIG. 5 to the position shown in FIG. 6, releases the downward pressure of the glass panel member 16 on the seal 38 so that by utilizing the handles 69 associated with the lock assemblies 56 and 58, the glass panel member 16 may be moved rearwardly in the guide or tracks 34 formed in the side members 22 and 24. It should be noted that the free end or pawl portion 72 of each of the clamp bars 68 are disposed within the sliding metal tracks 74. When the latches 56 and 58 are in their released position, shown in FIG. 6, they tend to raise the forward portion of the glass panel 16 to minimize the loading between the seal 38 and the glass member 16.

With the rear latch assembly 60 disengaged and with the forward latch assemblies 56 and 58 in their released position the panel 16 may be moved rearwardly by utilizing the handle portion 69 of the latch assemblies 56 and 58. Initial rearward movement of the panel 16 brings the rearward edge of the panel 16 into engagement with the ridge 42 on the intermediate member 26 as best seen in FIG. 7. The ridge 42 acts as a cam surface to raise the rearward or trailing edge of the panel 16 and to maintain it in elevated position relative to the seal 38 with the forward latch assemblies 56 and 58 supporting the forward edge of the panel 16 and with the cam 42 supporting the rearward edge of the panel 16 the latter can be moved rearwardly relatively free of the seal 38.

A sliding roof assembly has been provided which may be attached to the top of a roof of a vehicle adjacent an opening in the roof and in which a sliding panel member may be moved from a forward closed position to a rearward open position to admit air to the passenger compartment. The sliding panel member is made of glass to admit light and a novel seal and latch arrangement is provided by which the panel, in its closed position, is brought into tight sealing engagement with a continuous seal which prevents the entry of moisture or air into the passenger compartment. Upon unlatching the sliding panel, the forward latches act to support the forward portion of the glass panel member in a slightly elevated position relative to the seal and the rearward portion is held slightly elevated relative to the seal to minimize friction during sliding movement of the panel.

The embodiments of the invention in which an exclusive property or privilege is claimed are defined as follows:

1. A sliding roof assembly for attachment to the top surface of a roof of a vehicle in proximity to an opening in the vehicle roof, the combination of: a frame member having a pair of longitudinally extending side members, a forward member extending transversely between said side members, an intermediate member being disposed adjacent the rearward edge of said opening in the vehicle roof, said side members including guide portions forming slots facing each other, a panel member mounted with opposite edges in said slots for sliding movement between a forward position closing said opening and an open position rearwardly of said opening and above the roof, a continuous, endless seal means mounted on said side members and said forward and intermediate members at the underside of said panel member and in proximity to the perimeter of said opening, latch means associated with forward and rearward portions of said panel member and operable to pull the underside of said panel member into sealing engagement with said seal member when said panel is in its forward position and a cam means adjacent a rearward portion of said frame for separating said panel from said seal when said panel is moved to its rearward position.

2. The combination of claim 1 in which said latch means associated with the forward portion of said panel includes a pair of latch assemblies mounted on opposite sides of said panel, said latch assemblies including a lock portion, and guide means parallel to said guide portions for receiving said lock portions of said forward latch means during sliding movement of said panel member between open and closed positions.

3. The combination of claim 2 in which said lock portions of said latch means urge said panel upwardly relative to said seal when said latch assemblies are in their unlatched position for moving said panel to its open position.

4. The combination of claim 2 in which said latch assemblies each include a housing portion connected to said panel member, a clamp bar pivoted relative to said housing member and having a portion in said guide means, and a handle element for moving said lock bar towards said panel member to move the latter into engagement with said seal member for all positions of said panel member between open and closed positions.

5. The combination of claim 1 in which said latch means associated with a rearward portion of said panel includes a lock receiving assembly supported on said panel and a latch assembly mounted on said frame and in which said latch assembly is detachable from said lock receiving assembly to permit rearward sliding movement of said panel relative to said frame members.

6. The combination of claim 5 in which said lock receiving assembly includes a housing forming support surfaces therein, said latch assembly including a member movable relative to said frame and insertable in said housing for engagement with said support surfaces, and means for urging said member away from said frame for displacing said lock receiving assembly towards said seal to a locked position and for retaining said member in said locked position.

7. A sliding roof assembly for attachment to the top of a vehicle in proximity to an opening in a vehicle roof, the combination of: a frame member having a pair of longitudinally extending side members, a forward member extending transversely between said side members, an intermdiate member being disposed adjacent the rearward edge of said opening in the vehicle roof, said side members forming facing guide portions, a panel member mounted for sliding movement in said guide portions for movement between a forward position closing said opening and an open position rearwardly of said opening, seal means mounted on said side members and said forward and intermediate members in proximity to the perimeter of said opening, and latch meams associated with forward and rearward portions of said panel member and operable to pull said panel member into sealing engagement with said seal member when said panel is in its forward position, said latch means associated with a rearward portion of said panel including a lock receiving assembly supported on said panel and a latch assembly mounted on said frame, said latch assembly being detachable from said lock receiving assembly to permit rearward sliding movement of said panel relative assembly to permit rearward sliding movement of said panel relative to said frame members, said intermediate member forming a cam surface engagable with said panel upon rearward movement of the latter to maintain said panel in an elevated position relative to said seal.

8. The combination of claim 1 in which said seal means is a continuous piece of resilient material surrounding the perimeter of said opening and forming a plurality of continuous channel portions for accumulating moisture, and wall portions between said channel portions being in engagement with said panel when the latter is in a closed position.

9. A sliding roof assembly for attachment to the top of a vehicle in proximity to an opening in vehicle roof, a frame member having a pair of longitudinally extending side members disposed at opposite sides of said opening and forward and rearward members disposed adjacent forward and rearward ends of said opening, said side members forming guide portions, a panel member mounted for sliding movement in said guide portions between a forward position closing the opening in the vehicle roof and a rearward position in which said panel is disposed rearwardly of said opening, resilient seal means between said panel and said side and end members, a pair of guide members disposed in parallel relationship to said pair of guide portions, a pair of latch assemblies mounted on said panel member and each having a lock portion disposed in the associated one of said guide members, and means for moving said lock portions towards said panel member for moving the latter into tight sealing engagement with said seal means and for moving said lock portions away from said panel member for supporting said panel member relative to said seal means for easy sliding movement of said panel in said guide portions, said frame member presenting a cam surface engagable with an underside of said panel upon rearward movement of the latter to raise said panel relative to said seal.

10. The combination of claim 9 and further comprising a lock portion mounted on said frame intermediate said side members and a lock receiving member supported on said panel member, said lock portion being attachable to said lock receiving member when said panel member is in said forward position and being detachable from said lock receiving member to permit rearward sliding movement of said panel member relative to said frame member.

11. The combination of claim 9 in which said lock portions of said latch means urge said panel upwardly relative to said seal when said latch assemblies are in their unlatched position for moving said panel to its open position.

12. The combination of claim 9 and further comprising means associated with a rearward portion of said panel including a lock receiving assembly supported on said panel and a latch assembly mounted on said frame and in which said latch assembly is detachable from said lock receiving assembly to permit rearward sliding movement of said panel relative to said frame members.

13. The combination of claim 9 in which said panel is formed completely of transparent glass.

* * * * *

UNITED STATES PATENT OFFICE
CERTIFICATE OF CORRECTION

Patent No. 3,993,348　　　　　　　　　Dated November 23, 1976

Inventor(s) William J. Pizzuti

It is certified that error appears in the above-identified patent and that said Letters Patent are hereby corrected as shown below:

Column 8, Claim 7, line 43, after "latch" "meams" should read --means--.

Column 8, Claim 7, lines 52 and 53, delete "assembly to permit rearward sliding movement of said panel relative".

Signed and Sealed this

Twenty-second Day of March 1977

[SEAL]

Attest:

RUTH C. MASON　　　　　　　　　C. MARSHALL DANN
*Attesting Officer*　　　　　　　　*Commissioner of Patents and Trademarks*